No. 825,283. PATENTED JULY 3, 1906.
H. BEZER.
MOTOR.
APPLICATION FILED NOV. 27, 1903.

3 SHEETS—SHEET 1.

Witnesses:
Livingston Emery
Henry Barnes

Inventor.
Henry Bezer
by Henry D. Williams
Atty.

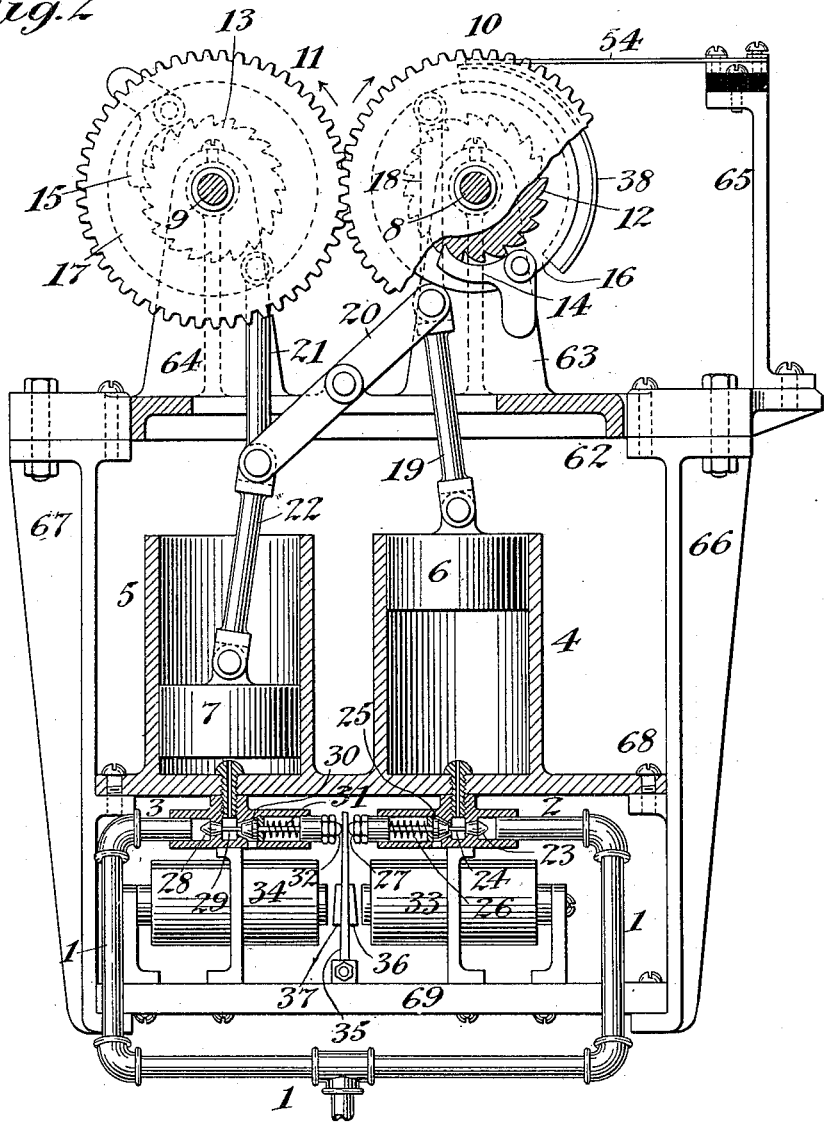

No. 825,283.
PATENTED JULY 3, 1906.
H. BEZER.
MOTOR.
APPLICATION FILED NOV. 27, 1903.
3 SHEETS—SHEET 3.
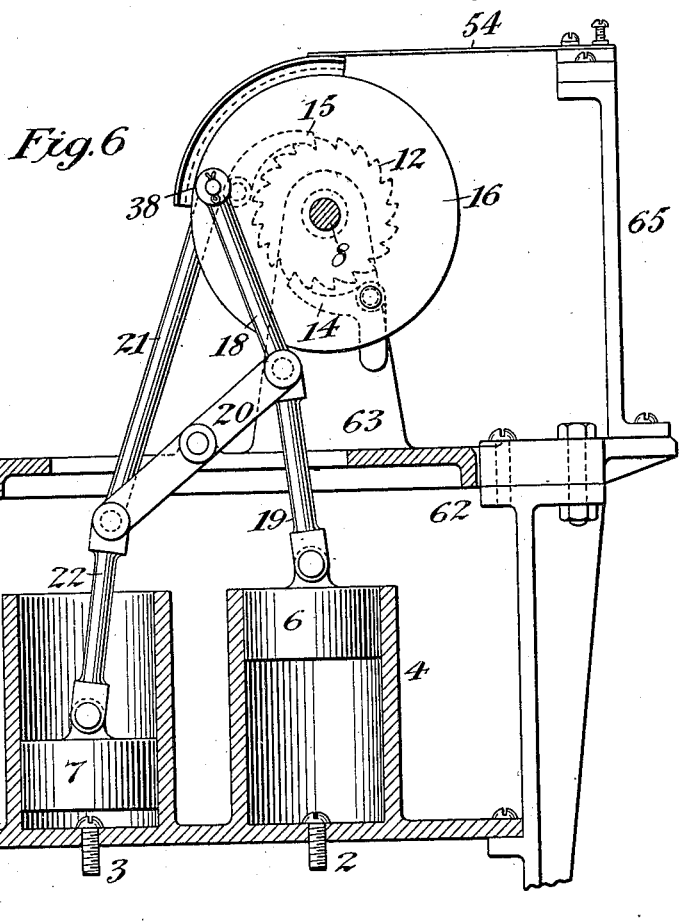
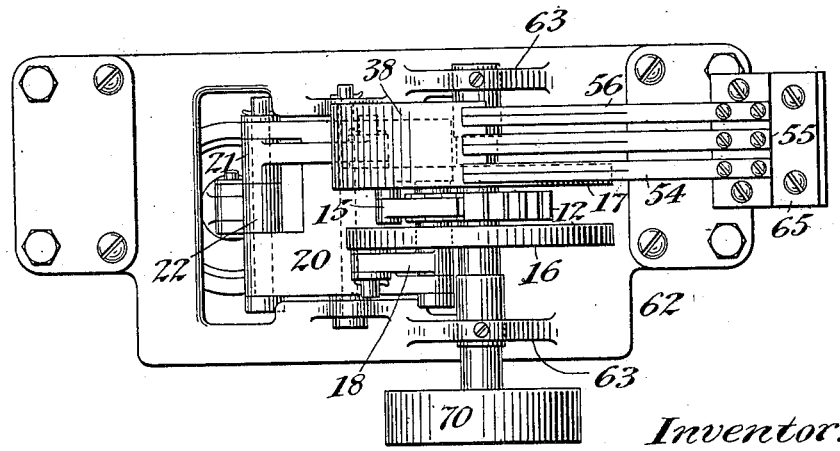
Witnesses:
Livingston Emery
Henry Barnes
Inventor:
Henry Bezer
by Henry D. Williams
Atty.
THE NORRIS PETERS CO., WASHINGTON, D. C.

UNITED STATES PATENT OFFICE.

HENRY BEZER, OF WESTFIELD, NEW JERSEY.

MOTOR.

No. 825,283.  Specification of Letters Patent.  Patented July 3, 1906.

Original application filed September 14, 1901, Serial No. 74,340. Divided and this application filed November 27, 1903. Serial No. 182,773.

*To all whom it may concern:*

Be it known that I, HENRY BEZER, a subject of the King of Great Britain, residing at Westfield, in the county of Union and State of New Jersey, have invented certain new and useful Improvements in Motors, of which the following is a specification, reference being had therein to the accompanying drawings, forming a part thereof.

My invention relates to electrically-controlled motors in which a reciprocating movement produced by a motive medium is changed into a rotary movement.

My invention consists in the provision of a plurality of prime movers, oscillating parts actuated thereby, and parts engaged by the oscillating parts, so as to receive rotation in one direction therefrom, and in the provision of means whereby one or another of the prime movers is at all times imparting forward movement to one rotating part.

My invention further consists in the provision of two prime movers and means connecting the same, so as to control the relative movements thereof and, further, so as to maintain the two prime movers in opposite phases of movement, and so that one or the other of the two prime movers at all times imparts forward movement to the one rotating part.

My invention further consists in various improvements in construction and combinations of parts.

My invention has for its objects reliability of action, uniform and continuous application of power, adaptability to slow movement at the shaft or rotary part in which the rotary movement is directly produced, the elimination of dead-centers and capability to start in any position and stop in any position, and other objects which will appear from the following description of the motor embodying my invention illustrated in the accompanying drawings.

I will now particularly describe the construction and operation of such motor and will thereafter point out my invention in claims.

Figure 1:
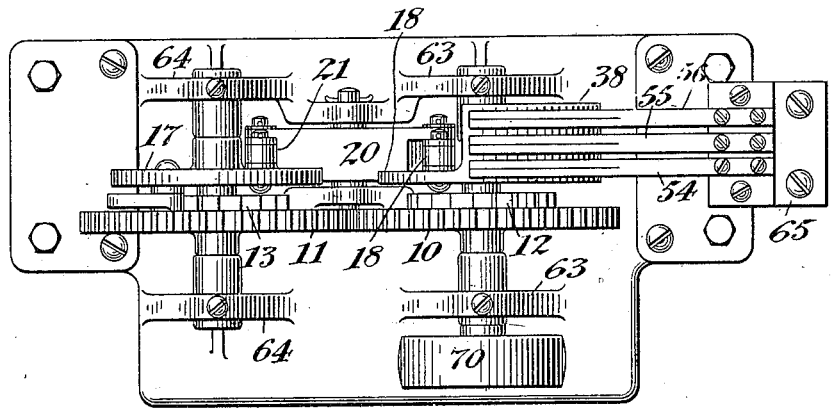
Figure 3:
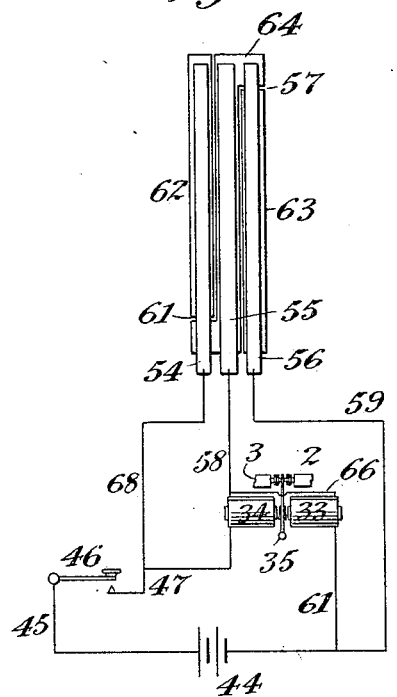
Figure 4:
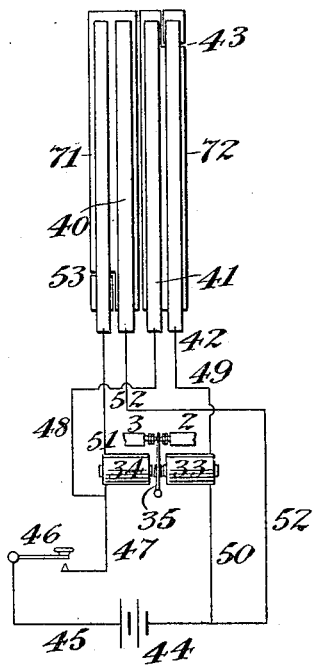

Figure 1 is a plan view of a motor embodying my invention. Fig. 2 is a front elevation of the same, partly in section. Fig. 3 is a diagrammatic view showing a development of the commutator and showing the circuit connections. Fig. 4 is a similar view of a modified construction of commutator and arrangement of circuits. Fig. 5 is a plan view of a motor of modified construction. Fig. 6 is a front elevation of the same, partly in section. Fig. 7 is a development of the commutator shown in Figs. 5 and 6.

The motor shown in the drawings is designed for the employment of a gas under pressure as the motive medium, and more particularly for the employment of compressed carbon dioxid supplied by the evaporation and expansion of liquid carbon dioxid under the control of well-known means for supplying such gas under a constant predetermined pressure. The prime movers shown are pistons working in cylinders, and in the constructions shown two of such prime movers are provided. The compressed gas or other motive medium enters through the conduit 1, this conduit dividing into two branches, one branch to each of two controlling-valves 2 3. Each of these valves controls the intake and exhaust of a cylinder— the valve 2 of the cylinder 4 and the valve 3 of the cylinder 5. Each cylinder is closed at one end and open at the other and has a piston working therein, the cylinder 4 having the piston 6 and the cylinder 5 having the piston 7, the ducts or passages from the valves entering the cylinders at their closed ends. The pistons are valveless and single-acting, being moved upwardly by the pressure of the compressed gas.

In the construction shown in Figs. 1 to 3, inclusive, two driving-shafts are provided, rotating in opposite directions, and the power may be taken from either one of these two shafts, each being a rotating part receiving a continuous rotary movement from the reciprocating movement of the prime movers. As shown, provision is made for taking power from the right shaft 8 by means of a pulley 70. The right driving-shaft 8 is located above the cylinder 4 and the left driving-shaft 9 above the cylinder 5, and the two driving-shafts are connected together, this connection being shown as effected by intermeshing spur-gears 10 11. Each driving-shaft is provided with a driving ratchet-wheel, these driving ratchet-wheels 12 and 13, respectively, being shown as formed upon or secured to the respective connecting-gears. A weighted pawl is provided for each ratchet-wheel—the pawl 14 for the ratchet-wheel 12 and the pawl 15 for the ratchet-wheel 13—and each pawl is carried by a disk pivoted to oscillate upon its corresponding driving-shaft—the disk 16 on the right driving-shaft 8 and the disk 17 on the left driving-shaft 9. Each disk is connected to a piston by a jointed connection or connecting rod, the right disk 16 having one end of the part-connecting rod 18 pivotally connected to it and the corresponding piston 6 having one end of the part-connecting rod 19 pivotally connected to it, and the part-connecting rods being jointed together and to the right end of a cross-lever 20, the cross-lever 20 being fulcrumed at a fixed point and shown as pivoted on the frame. The left disk 17 has pivotally connected to it at one end the part-connecting rod 21, and the corresponding piston 7 has pivotally connected to it at one end the part-connecting rod 22, and the two part-connecting rods 21 and 22 are jointed together and at the left end of the cross-lever 20, the two jointed connecting-rods being thus connected to opposite ends of the cross-lever. The function of the cross-lever is to control the relative movements of the pistons and to compel the pistons to move at all times in opposite phases, so that upon the completion of the upward stroke of one piston the other piston will be ready to commence its upward stroke, and vice versa, thus insuring a continuous application of the power of the motive medium. It has the further function of forcing the return movement of each piston, thus insuring complete movements and permitting tight packing of the pistons. During the upward stroke of each piston the corresponding pawl drives its ratchet-wheel, while during the downward stroke of each piston the corresponding pawl is returned to the position occupied by it at the beginning of the preceding stroke, and thus the disks and pawls receive an oscillating movement and the pawls successively impart forward movement to the driving-shafts, the forward movement imparted by one pawl operating both driving-shafts by reason of the connection of the two shafts. Each controlling-valve is so constructed that the opening of the intake closes the exhaust and the opening of the exhaust closes the intake, this being shown as accomplished by providing a single stem for the intake and exhaust valves and locating their seats oppositely, so that the movement of the stem which opens one valve will close the other, and vice versa. As shown, the intake-valve 23 of the right cylinder 4 is carried on a stem 24, which also carries the exhaust-valve 25, and the intake-valve is held closed and the exhaust-valve open by a spring 26, and a projecting stem 27 is provided whereby the valve is actuated. The intake-valve 28 of the left cylinder 5 is on the same stem 29 with the exhaust-valve 30, and the spring 31 holds the intake-valve closed and the exhaust-valve open, and the valve is actuated by the projecting stem 32. The actuation of these valves is accomplished through electromagnetic means, and to this end I provide two opposite controlling-electromagnets 33 and 34 and an armature-lever 35, the armature-lever carrying armatures 36 and 37, working between the opposite poles of the electromagnets. The upper end of the armature-lever is arranged so as to directly actuate the valve-stems 27 and 32 by pressure thereon, and the springs or resilient devices of the valves return the armature-lever to the normal position shown. I provide means for controlling the energization of these electromagnets so as to cause the desired movements of the valves, and to this end I provide a commutator 38, shown as an arc-shaped part carried on the right oscillating disk 16, and this commutator 38 has conducting-plates upon its surface and coöperates with commutator-brushes. In the construction of commutator shown in Figs. 1 and 3 I provide three commutator-brushes, and in the construction of commutator shown in Fig. 4 I provide four commutator-brushes. The framework is shown as comprising a bed-plate 62, from which project upwardly standards 63 and 64, containing the bearings for the driving-shafts and to which is secured the bracket 65 for the commutator-brushes. Hangers 66 and 67 are provided, secured to and extending down below the bed-plate, these hangers supporting a cross-plate 68, having the cylinders 4 and 5 in one piece therewith and also carrying a lower base-plate 69, of stone or other insulating material, on which are supported the electromagnets 33 and 34 and the bearings for the armature-lever 35.

I will first describe the commutator and circuits of the main views of the drawings and will refer particularly to Fig. 3, which shows a development of the commutator and shows the circuits diagrammatically. The commutator 38 is shown in the position which it occupies at the completion of the upstroke of the right-hand piston 6; but the circuits are shown as normally open at the controlling-switch 46, and therefore the controlling-electromagnets are deënergized and the armature-lever is in normal position, with both intake-valves closed and both exhaust-valves open. When the commutator is in any intermediate position with the brushes on any line between the breaks 57 and 61, the outer brushes 54 and 56 are in contact with dead-plates 62 and 63, respectively, of the commutator, and the middle brush 55 is the only brush in contact with the main plate 64 of the commutator. Therefore no circuits are closed at the commutator. The electric current will then flow from the battery directly through both electromagnets in series as follows: from battery 44 through wire 45, controlling-switch 46, (shown in open condition,) wire 47, left electromagnet 34, wire 66, right electromagnet 33, and wire 61, back to battery. With both electromagnets thus energized the armature will be oppositely attracted thereby. I provide that the normal position of the armature-lever 35 shall be with one armature in closer proximity to the poles of its electromagnet than the other, and I have shown the right armature 36 as normally in closer proximity to the poles of its electromagnet 33 than the left armature, so that if the controlling-switch 46 is closed with the commutator in any intermediate position and both electromagnets are energized the pull of the right electromagnet 33 will preponderate and the armature-lever will be moved to the right, opening the intake-valve 23 of the right-hand cylinder 4. After the starting movement the energization of both electromagnets will cause the armature-lever 35 to be retained in either extreme position occupied by it at the commencement of such energization of both electromagnets, and I provide that just before each prime mover reaches its extreme position the electromagnet which has attracted and held its armature shall be deënergized, thereby permitting the other electromagnet to attract and hold its armature and moving the armature-lever to the other extreme position. For example, in the construction shown I provide that shortly before the commutator reaches the position shown—that is, shortly before the completion of the upstroke of the right piston 6—the right dead commutator-plate 63 will move clear of its commutator-brush 56 and the main commutator-plate 64 will come in contact with such brush and will thereby close a shunt-circuit, excluding the right electromagnet 33, thus deënergizing that electromagnet and permitting the left electromagnet 34 to attract and hold its armature, thereby moving the armature-lever 35 to extreme left position, permitting the intake-valve 23 of the right cylinder 4 to close and the exhaust-valve 25 thereof to open and opening the intake-valve 28 and closing the exhaust-valve 30 of the left cylinder 5. The short circuit thus closed proceeds from the left electromagnet 34 through wire 58, brush 55, main commutator-plate 64, brush 56, and wire 59. In like manner shortly before the commutator reaches its other extreme position the left dead-plate 62 moves clear of its brush 54 and the main commutator-plate 64 comes in contact with this brush, thereby closing a short circuit, excluding the left electromagnet 34, deënergizing this electromagnet, and causing the armature-lever 35 to be moved to extreme right position. The short circuit thus closed proceeds from wire 47· by wire 68, brush 54, main commutator-plate 64, brush 55, and wire 58 to wire 66.

In the modified construction of commutator and arrangement or circuits shown in Fig. 4 I provide that when the commutator is in intermediate position the two electromagnets are connected in multiple with the battery, and there are four commutator-brushes— the two brushes 41 and 42 for the circuit of the right electromagnet 33 and the other two brushes 39 and 40 for the circuit of the left electromagnet 34. The circuit for the right electromagnet 33 is as follows: from battery 44 by wire 45, switch 46, wires 47 48, brush 41, right connecting-plate 72, brush 42, wire 49, right electromagnet 33, and wire 50, back to battery. The circuit for the left electromagnet 34 is as follows: from battery 44 by wire 45, switch 46, wire 47, left electromagnet 34, wire 51, brush 39, left connecting-plate 71, brush 40, and wire 52, back to battery. Shortly before the commutator reaches the extreme position shown the break 43 of the commutator passes under the brush 42, the right connecting-plate 72 passing clear of this brush, and thereby the circuit for the right electromagnet 33 is opened. Shortly before the commutator reaches the other extreme position the break 53 passes under the commutator-brush 39, and thereby the circuit for the left electromagnet 34 is opened.

In the modified construction of motor shown in Figs. 5, 6, and 7 a single driving-shaft 8 is shown, and both oscillating disks 16 and 17 are mounted concentrically with this driving-shaft free to rotate relatively thereto, and a single ratchet-wheel 12 is engaged by both pawls 14 and 15, these pawls being arranged so that each is clear of the path of movement of the other. Jointed connecting-rods 18 19 and 21 22 and a cross-lever 20 are provided, as in the construction heretofore described, but the upper parts of each connecting-rod are at a greater angle to the lower part-connecting rods to accommodate the concentric arrangement of the oscillating disks. The pistons, cylinders, valves, and electromagnetic valve-operating means are as already described, and the valves and valve-operating means are therefore not shown. The commutator 38 is here shown as on the disk actuated by the left piston 7, and this calls for a reversal in the arrangement of the commutator-plates, as illustrated in Fig. 7, and the circuit connections to the commutator-brushes 54, 55, and 56 are as heretofore described relative to Fig. 3 and are not, therefore, shown.

The electromagnetic controlling means shown and above described is not claimed herein, but is claimed in my application filed September 14, 1901, Serial No. 74,340, of which this application is a division.

It is obvious that various modifications made be made in the construction shown and above described within the spirit and scope of my invention.

What I claim, and desire to secure by Letters Patent, is—

1. The combination of a plurality of reciprocating prime movers, automatic controlling means for controlling the supply of a motive medium thereto, a rotating part, and connecting means between the prime movers and the rotating part, such connecting means receiving oscillating movements from the prime movers and imparting movement in one direction to the rotating part.

2. The combination of a plurality of reciprocating prime movers, automatic controlling means for controlling the supply of a motive medium thereto, a rotating part and continuously-acting connecting means between the prime movers and the rotating part, such connecting means receiving oscillating movements from the prime movers and at all times imparting movement in one direction only from one or the other of such prime movers to the rotating part.

3. The combination of a plurality of reciprocating prime movers, means for supplying a motive medium thereto, automatic controlling means for such motive-medium-supplying means, a rotating part, and connecting means between the prime movers and the rotating part whereby each prime mover imparts rotary movement to the rotating part by movement in one direction of its reciprocation.

4. The combination of a plurality of reciprocating prime movers, means for supplying a motive medium thereto, controlling means for such motive-medium-supplying means controlled by the prime movers, a rotating part, and continuously-acting connecting means connecting together the prime movers so as to control the relative movements thereof and connecting the prime movers and rotating part so that each prime mover imparts rotary movement to the rotating part by movement in one direction of its reciprocation and one or another of the prime movers at all times imparts movement in the same direction to the rotating part.

5. The combination of a plurality of prime movers, automatic controlling means for controlling the supply of a motive medium thereto, a rotating part, a part for each prime mover moving with the rotating part, and an oscillating part for each prime mover connected thereto so as to receive oscillating movement therefrom and engaging its part moving with the rotating part so as to rotate the latter in one direction only.

6. The combination of a plurality of prime movers, means for supplying a motive medium thereto, controlling means for such motive-medium-supplying means controlled by the prime movers, a rotating part, a part for each prime mover moving with the rotating part and an oscillating part for each prime mover connected thereto so as to receive oscillating movement therefrom and engaging its part moving with the rotating part so as to rotate the latter in one direction only, the several prime movers and connections being arranged so that one or another is at all times imparting movement in the same direction to the rotating part.

7. The combination of two prime movers, automatic controlling means for controlling the supply of motive medium thereto, a rotating part, engaging means moving with the rotating part, an oscillating part for each prime mover connected thereto so as to receive oscillating movement therefrom and engaging the means moving with the rotating part so as to rotate the latter by movement in one direction only of its reciprocation, and means connecting the two prime movers so as to control the relative movements thereof.

8. The combination of two prime movers, automatic controlling means for controlling the supply of a motive medium thereto, a rotating part, engaging means moving with the rotating part, an oscillating part for each prime mover connected thereto so as to receive oscillating movement therefrom and engaging the means moving with the rotating part so as to rotate the latter by movement in one direction only of its reciprocation, and means connecting the two prime movers so as to control the relative movements thereof, the two prime movers and connecting means being arranged so that they are at all times in opposite phases of movement and one or the other at all times imparts movement in the same direction to the rotating part.

9. The combination of a plurality of prime movers, automatic controlling means for controlling the supply of a motive medium thereto, a rotating part, a ratchet device moving with the rotating part, a pawl for each prime mover coacting with the ratchet device, and connecting means from the corresponding prime mover for imparting an oscillating movement to such pawl.

10. The combination of two prime movers, automatic controlling means for controlling the supply of a motive medium thereto, a rotating part, a ratchet device moving with the rotating part, and a pawl for each prime mover coacting with the ratchet device and connecting means from the corresponding prime mover for imparting an oscillating movement to such pawl, and means connecting the two prime movers to control the relative movements thereof, the two prime movers and connecting means being so arranged that they are at all times in opposite phases of movement and one or the other at all times imparts movement in the same direction to the rotating part.

11. The combination of two prime movers, automatic controlling means for controlling the supply of a motive medium thereto, a connecting-rod for each prime mover, a pivoted cross-lever pivotally connected to each of such connecting-rods, a rotating part and means for applying power from one or the other of such connecting-rods to at all times impart movement in the same direction to the rotating part.

12. The combination of two prime movers each adapted to receive reciprocating movement from a motive medium, a jointed connecting-rod for each prime mover, a cross-lever having a stationary pivotal point and connected at opposite sides of such stationary pivotal point to the jointed connecting-rods, a rotating part and means for applying power from such connecting-rods to the rotating part by movement in one direction of the reciprocation of each prime mover.

13. The combination of two reciprocating prime movers, an oscillating part for each prime mover, a jointed connecting-rod from each prime mover to its oscillating part, a cross-lever having a stationary pivotal point and pivotally connected at opposite sides of such stationary pivotal point to the jointed connecting-rods at the joints thereof, a rotating part, and means for applying power from the oscillating parts to the rotating part in one direction only.

In testimony whereof I have affixed my signature in presence of two witnesses.

HENRY BEZER.

Witnesses:
HENRY D. WILLIAMS,
HERBERT H. GIBBS.